S. BROWN.
REFLECTOR HEADLIGHT.
APPLICATION FILED APR. 26, 1915.
1,359,789.
Patented Nov. 23, 1920.
2 SHEETS—SHEET 1.
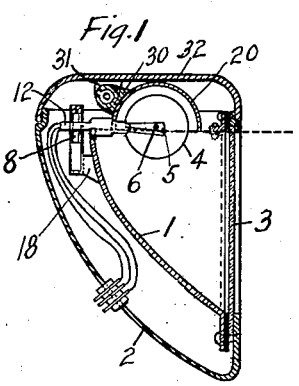
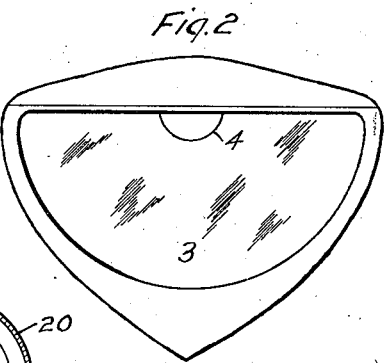
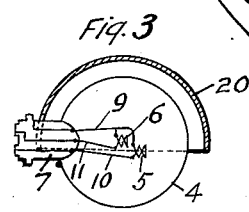
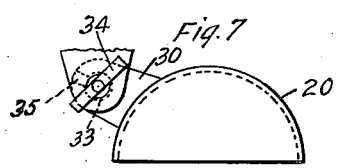
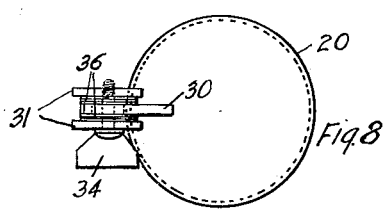
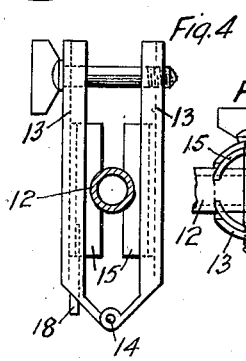
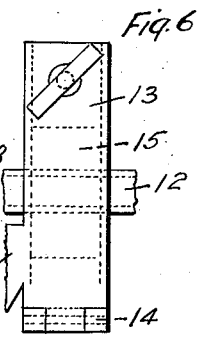
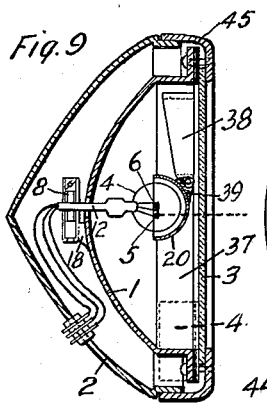
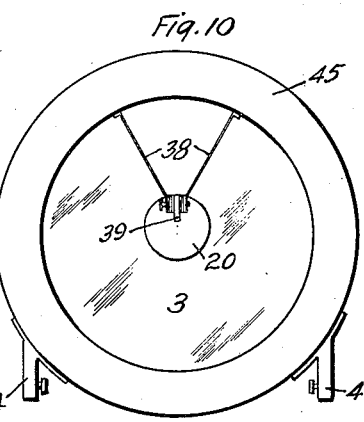
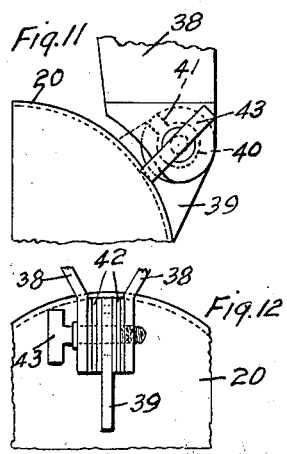
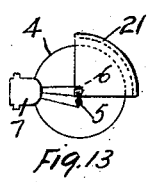
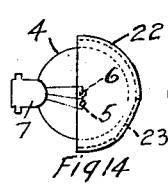
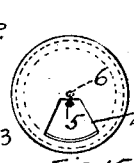
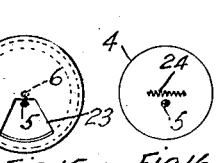
INVENTOR
Stanley Brown
BY
ATTORNEYS.

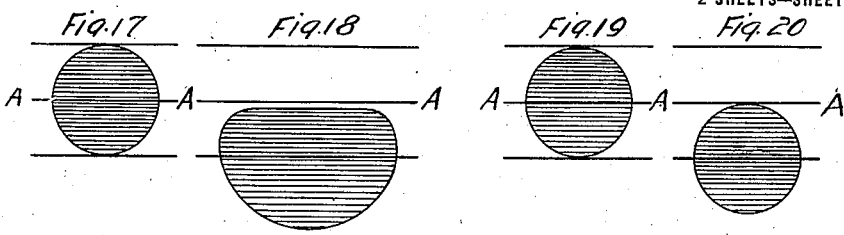
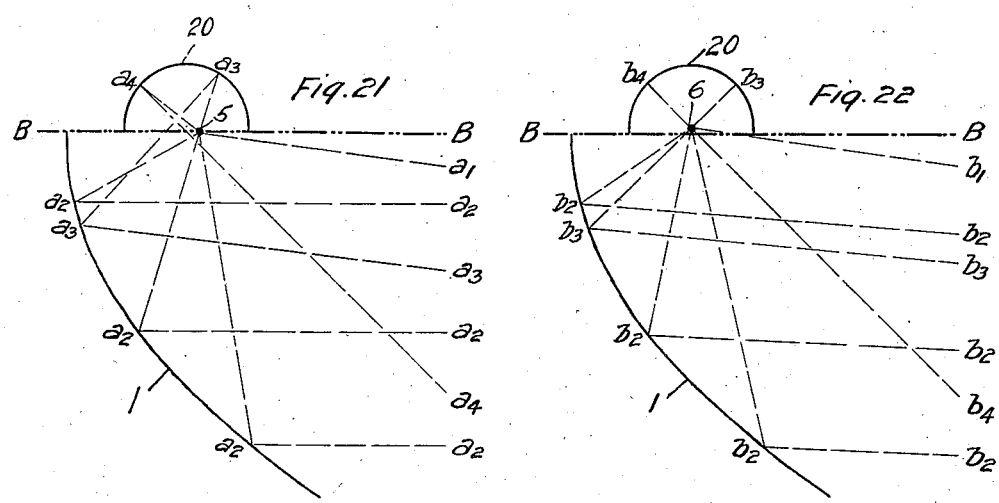
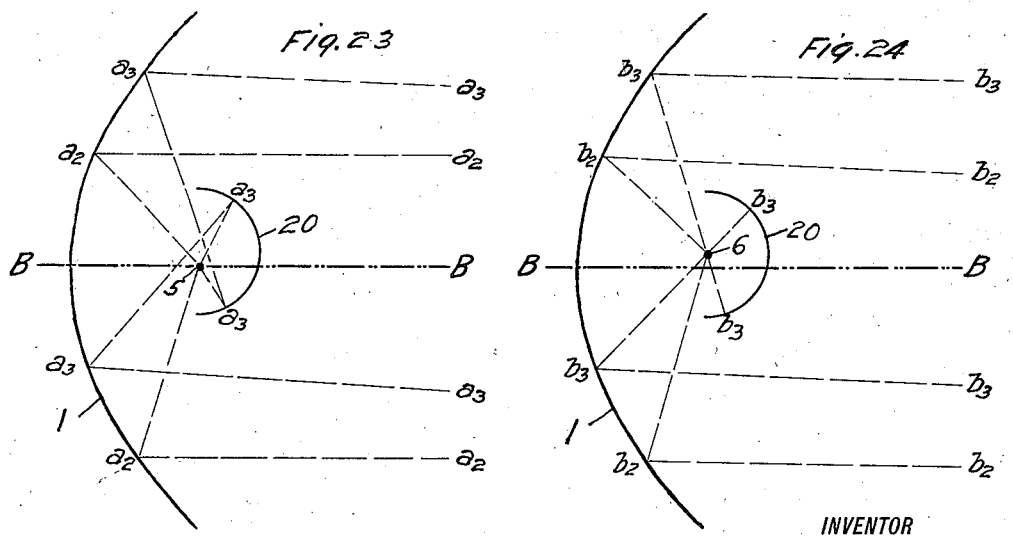

UNITED STATES PATENT OFFICE.

STANLEY BROWN, OF GARDEN CITY, NEW YORK.

REFLECTOR-HEADLIGHT.

1,359,789. Specification of Letters Patent. Patented Nov. 23, 1920.

Application filed April 26, 1915. Serial No. 23,872.

*To all whom it may concern:*

Be it known that I, STANLEY BROWN, a citizen of the United States, residing at and whose post-office address is Garden City, county of Nassau, State of New York, have invented certain new and useful Improvements in Reflector-Headlights; and I do hereby declare the following to be a full, clear, and exact description of the invention, such as will enable others skilled in the art to which it appertains to make and use the same.

In driving along country roads, it is desirable that an intense cylindrical beam of light be projected substantially horizontally from the headlights of an automobile or other rapidly moving vehicle to effectively illuminate the way at a considerable distance ahead, and it is essential in cities or other populated districts and in passing other vehicles along country roads that substantially all of the light be projected below the horizontal out of the line of vision of pedestrians and other drivers. In both cases, an effectively directed illumination of much intensity should be provided for the more distant points ahead, and a suitable amount of diffused illumination should be provided along a considerable stretch of the way directly ahead of the vehicle. Furthermore, the desired illumination should be obtained efficiently in order to conserve the battery charge.

For automobiles, headlights have been used heretofore for country driving and side lights or headlights screened or otherwise reduced in intensity have been used in cities; or else two sources of light have been installed in each headlight, one source for projecting the horizontally-directed cylindrical beam for country roads, and a second source of less intensity for projecting a weak diffused light for city streets. From the second source, most of the rays projected forwardly were undesirably divergent to the horizontal axis, either upward, sidewise or unsuitably downward, and were therefore subtracted from the effective illumination. Furthermore, in producing illumination for city driving from a second source in the headlight, the effectively directed rays formed but a small part of the total projection, and thus gave an inefficient and insufficient light for the purpose.

In accordance with my invention, I provide one source of light so positioned in a reflecting system that substantially all of the rays projected from the headlight are directed to one side of the axis of the main reflector, usually downward, to form an intense beam for distant illumination and suitable diffusion for the near way; and I prefer to provide also another source of light so positioned in the same reflecting system that the rays projected from the headlight form a substantially cylindrical beam approximately axially-directed to produce intense illumination for distant points and a suitable diffusion for the near way. The first projection gives an intense illumination for a considerable distance ahead, and is suitable for passing other vehicles on country roads and for driving along city streets because the rays are projected from the headlights in a downward path out of the line of vision of pedestrians and other drivers; whereas the other projection is intended more for illumination at greater distances ahead for driving rapidly along country roads. More specifically, I provide a main reflector, preferably of parabolic form, a source of light slightly removed from the focus of the main reflector, and a supplementary reflecting surface opposed to the main reflector so as to reflect to the main reflector in suitable directions substantially all the rays issuing upwardly and forwardly from the source of light, the result being that, when the main reflector and the supplementary reflecting surface are suitably correlated, as hereinafter described, substantially all the rays, are projected from the headlight below the axis of the main reflector; and preferably, I provide also a source of light positioned substantially at the focus of the main reflector for producing a substantially cylindrical beam which is approximately axially-directed. Preferably, the source of light removed from the focus is of at least the candle power of the other source, and the supplementary reflecting surface reflects to the main reflector for downward projection from the headlight, practically all of the rays from the source of light at the focus issuing in a forwardly and upwardly direction, as is the case also with the rays from the other source of light.

Furthermore, by providing a supplementary reflecting surface arranged according to my invention, the main reflector may be principally on one side of a plane through its focus, which plane may, if desired, contain the axis of the main reflector. By confining the main reflector principally to one side of a plane through the focus of the main reflector, it is possible to employ in the same dimensions a main reflector of longer focus, which, for a given compactness of the source of light, increases the effectiveness of projection from a source at the focus or slightly removed therefrom; and by confining the main reflector principally to one side of a plane containing its axis, it is not only possible to obtain intense illumination at distant points and improved diffusion along the near way, but also the headlight attains a form that may be inconspicuously associated with an automobile.

In the accompanying drawings illustrating the preferred embodiment and several modifications within my invention, Figure 1 shows a central vertical section through the preferred form of headlight; Fig. 2 is a front elevation thereof; Fig. 3 is an enlarged view of an incandescent lamp and a supplementary reflector therefor; Figs. 4, 5 and 6 are enlarged views of an adjustable bracket for the incandescent lamp; Figs. 7 and 8 are side and top elevations, respectively, of the supplementary reflector of Fig. 1 drawn to an enlarged scale; Fig. 9 is a central vertical section of a modified form of headlight; Fig. 10 is a front view thereof; Figs. 11 and 12 are detail views, on an enlarged scale, of the supplementary reflector of Fig. 9; Fig. 13 shows a modified form of supplementary reflector; Figs. 14 and 15 show a side and front view of still another form of supplementary reflector; Fig. 16 shows particularly a modified form of the filament constituting a second source of light; Fig. 17 illustrates a cross section of the beam of light projected by the primary source of Fig. 1; Fig. 18 illustrates a cross section of the beam projected by the second source of Fig. 1; Fig. 19 illustrates a cross section of the beam projected by the primary source of Fig. 9; Fig. 20 illustrates a cross section of the beam projected by the second source of Fig. 9; Figs. 21 and 22 are projection charts for the lamp of Fig. 1; and Figs. 23 and 24 are projection charts for the lamp of Fig. 9.

The main reflector 1 of parabolic form is supported by a casing 2 and has a glass cover 3. The incandescent lamp 4 has two filaments 5 and 6, the middle point of the primary source 5 being located at the focus of the main reflector 1, and the middle point of the second source 6 being slightly removed therefrom (about $\frac{1}{8}$ the focal length of the main reflector in the preferred form), and preferably having a candle power at least as great as that of the primary source. As shown, the main reflectors in both Figs. 1 and 9 are of the long focus type, whereby the filaments are considerably in front of the reflector and therefore produce a more concentrated beam than would result from similarly compacted filaments and a reflector of shorter focal length. The lamp base 7 is supported by the bracket 8 which is shown as attached to the rear of the main reflector, and the two filaments are electrically connected to a common leading-in wire 9, which is soldered to the shell of the lamp base, and to two other leading-in wires 10 and 11, all of these wires being insulated from each other and connected to three wires which extend from a suitable switch for connecting either one of the filaments at a time in circuit with the battery or other source of current supply.

The supplementary reflector 20 is centered on the middle point of the filament 6, which in Fig. 1 is slightly behind the filament 5 as well as slightly above it, and which in Fig. 9 is slightly above the filament 5; the axis of the supplementary reflector being slightly removed from the focus of the main reflector. In both modifications, the main reflector 1 terminates in a plane through the focus, which in Fig. 1 contains its axis shown in broken lines, and which in Fig. 9 is perpendicular to its axis shown in broken lines.

In Fig. 1 the supplementary reflector 20 is of spherical contour and terminates in said axis, the supplementary reflector thus extending slightly below the second source and forming slightly more than a hemisphere. In Fig. 9 the supplementary reflector 20 is also of spherical contour but terminates slightly beyond the plane through the focus, although substantially in said plane, and forms slightly more than a hemisphere.

Instead of using a hemispherical supplementary reflector, I may use in the embodiment of Fig. 9 the 90° reflector 21 shown in Fig. 13, or as shown in Figs. 14 and 15, a reflector 22 which has an opening 23 for passage of suitably downwardly-directed unreflected rays from the primary source 5 or the second source 6, and also for passage of horizontally-directed unreflected rays from the primary source 5. It will be observed that the supplementary reflectors 20, 21 or 22 are arranged to intercept all of the unreflected rays directed forwardly and upwardly, that is both forwardly and upwardly, irrespective of the source of light from which they emanate, and it will also be observed that the supplementary reflectors are opposed to the main reflector and partly encompass both sources of light 5 and 6.

When the primary source 5 is used, substantially all the rays going directly to the main reflector 1 are projected therefrom as an approximately axially-directed cylindrical beam, or a cone of minute angle; whereas the rays going directly to the supplementary reflector are then reflected to the main reflector 20 at such angles as to project therefrom in paths slightly below the horizontal. Therefore, in addition to the intense beam for illuminating the way at a great distance ahead, the rays which if not intercepted by the supplementary reflector would travel forwardly and upwardly, are directed to effectively illuminate the nearer way. This result is due to the fact that the two reflectors extend, as shown, substantially to a plane through the focus of the main reflector, and also to the fact that the supplementary reflector is not centered on the primary source 5. As a matter of fact, it is only necessary that one of the reflecting surfaces terminate substantially in a plane through the focus of the main reflector, but for the best efficiency of the headlight, both reflectors should terminate substantially in that plane.

Figs. 21 and 23 illustrate the projection of the rays from the primary source 5 of the headlights of Figs. 1 and 9, respectively, when the source is regarded as a point. It will be observed that all the rays $a_2$ which go directly to the main reflector are projected from the headlight in the form of a beam parallel to the axis B—B of the main reflector. Also, all those rays $a_3$ which are projected from the main reflector after being reflected thereto by the supplementary reflector are inclined slightly downwardly of the axis B—B. Furthermore, the rays $a_4$ in Fig. 21 which are projected from the headlight by the supplementary reflector are inclined downwardly at various angles; while the rays $a_1$ projected directly from the source are for the most part downwardly inclined at various angles, some of them supplement the intense beam. As a practical matter, the source of light cannot be confined to the focal point of the main reflector, and in using a compacted ball filament, most of the projected rays $a_2$ are slightly divergent and in fact form a shaft or beam of circular section as shown in Fig. 17.

Figs. 22 and 24 illustrate the projection of the rays from the second source 6 of the headlights of Figs. 1 and 9, respectively, when the source is regarded as a point. It will be observed that all of the rays $b_2$ which go directly to the main reflector are projected in the form of a beam slightly inclined below the axis B—B of the main reflector. All the rays $b_3$ strike the supplementary reflector and are returned through the source 6, thereafter striking the main reflector and supplementing the inclined beam. In Fig. 22, the rays $b_4$ (which are likewise returned through the source to the main reflector) together with the unreflected rays $b_1$, are projected downwardly at various angles. Since the main reflector 1 has the form of a parabola of long focus, and since the second source 6 is slightly removed from the focus of said reflector, the rays for the most part are projected from the headlight but slightly below the horizontal, thus providing an intense shaft or beam suitable for illumination at a great distance ahead, and also providing diffused light for illumination of the near way. It will be observed that all the rays actually remain below the horizontal in the arrangements shown, or to one side of a plane in which lies the axis of the main reflector in case the headlight is turned around. This result is due to the fact that the second source of light 6 is so positioned in the reflecting system, slightly removed from the focus of the main reflector and positioned at the center of the supplementary reflector, and the reflectors are so terminated, that all the rays from the second source striking the main reflector, either directly or by reflection from the supplementary reflector, do so at suitable angles and entirely to one side of a plane through the focus of the main reflector. Furthermore the unreflected rays from the second source 6 of the headlight of Fig. 1 are confined below the horizontal since the supplementary reflector extends to the axis of the main reflector, or, in other words, horizontally below the second source 6.

In the cross sections shown in Figs. 17 to 20, the line A—A indicates the horizontal plane containing the axis of the main reflector. Fig. 17 illustrates the beam made up of the projected rays $a_2$ and some of the rays $a_1$, emanating from the primary source 5 of the headlight of Fig. 1 and serving to illuminate distant points; whereas the rays $a_3$ and $a_4$, together with most of the rays $a_1$, illuminate the nearer way, and are not included in Fig. 17.

Fig. 19 illustrates the beam made up of the projected rays $a_2$ emanating from the primary source 5 of the headlight of Fig. 9, and serving to illuminate distant points. All the rays $a_3$ are projected slightly below the axis B—B of Fig. 23 and illuminate the nearer way and are not included in Fig. 19. Fig. 18 illustrates on the same scale as Fig. 17 the rays $b_2$ and $b_3$ forming the concentrated portion of the projection emanating from the second source 6 of the headlight of Fig. 1, and serving to illuminate distant points. The rays $b_1$ and $b_4$ of Fig. 22 illuminate the nearer way and are not included in Fig. 18. Fig. 20 illustrates on the same scale as Fig. 19 the projected rays $b_2$ and $b_3$ emanating from the second source 6 of the headlight of Fig. 9, and serving to illuminate the way for a considerable distance ahead.

The spreading action illustrated by Fig. 18 is obtained by using for the second source 6 of Fig. 1, a compact ball filament located slightly to the rear as well as slightly above the focus of the main reflector. A laterally spreading action could be obtained in the headlight of Fig. 9 by using for the second source the laterally spread filament 24 of Fig. 16 located above the focus of the main reflector, and still all the rays would issue slightly below the horizontal. The primary source 5 of Fig. 9 could similarly be disposed laterally with the result that the concentrated beam would be spread laterally. For both sources this is possible because the main reflector is of parabolic form and does not extend past the plane through its focus perpendicularly to its axis.

In both modifications, the supplementary reflector 20 is centered on the middle point of the second source 6, the result being that all of the rays emanating from either source and going directly to the supplementary reflector are projected downwardly from the headlight. If the supplementary reflector were centered at the middle point of the primary source or further in that direction from the second source, some of the rays from the second source going directly to the supplementary reflector and then to the main reflector would be projected above the horizontal. The supplementary reflector may, however, be variously positioned provided that it is centered on the same side of the middle point of the primary source as is the middle point of the second source.

In order that all rays emanating from the second source 6 are projected downwardly, I prefer to center the spherical curvature of the glass bulb of the incandescent lamp 4 at the middle point of the second source 6 because otherwise the reflection from the inside of the glass would form a "phantom" which actually produces an appreciable projection of undesirably directed rays. Therefore I prefer that the axis of the incandescent bulb and its base be slightly removed from the axis of the main reflector, as shown.

It is desirable to have a certain latitude of adjustment of the sources of light in the reflecting system. Figs. 4, 5 and 6 show the details of the preferred form of adjustable support for the incandescent lamp 4, and this support may be used in the various modifications shown herein, as well as in other types of lamps. As shown in Figs. 1 and 9, the support is attached to the rear of the main reflector 1 by the flange 18. The clamping arms 13 hinged at 14 are cylindrically recessed, and the cylindrical shell jaws 15 fit therein in various vertical and angular positions. The tube 12, carrying the electrical connections for the lamp filament and also forming an attachment for the lamp socket, is rotatably held in the jaws 15, and may also be adjusted axially therein. By these means, the incandescent lamp 4 may be moved in and out and up and down, and laterally to one side or the other, and may also be rotated at any of these positions.

The supplementary reflector may be secured in adjusted position in any suitable way. For instance in Fig. 1, the supplementary reflector 20 is attached to an ear 30 which is adjustably secured to the bracket 31 extending from the cover 32 of the headlight. As shown best in Figs. 7 and 8, the ear 30 has an opening 33 considerably larger than the shaft of the wing bolt 34, and it also has a radial slot 35 through which the bolt may pass in removing the supplementary reflector from the bracket. The thin washers 36 are provided on both sides of the ear 30 between the arms of the bracket 31 for positioning the supplementary reflector laterally. In this way, the supplementary reflector may be adjusted axially and laterally, and may be turned about the bolt 34 at any axial or lateral position, so that the reflecting surface thereof may be adjusted in desired relation to the incandescent lamp 4.

In Fig. 9, the supplementary reflector 20 is supported in adjustable position from the rim or extension 37 of the main reflector shell by the thin arms 38, as shown best in Figs. 11 and 12. The supplementary reflector has an ear 39 having a central hole 40, and a radial slot 41, the ear being secured to the arms 38 between removable washers 42 by means of the wing bolt 43. Thus the supplementary reflector 20 may be removed to renew the incandescent lamp 4 when the reflector 1 has been withdrawn from the retaining rim 45.

Owing to the outer form, the headlight shown in Figs. 1 and 2 may be placed conveniently under the mud guard of an automobile, or in the radiator structure, thereby conforming to the lines of the car, or occupying an inconspicuous or a distinctive position. The headlight of Fig. 9 may be carried by a bracket by means of the attachment sockets 44 which are fastened on the outside of the retaining rim 45.

While I prefer in this form of headlight to provide the supplementary reflector as shown in Fig. 1, yet I may appropriately shape the inner surface of the headlight cover 34 to act as this element also. Furthermore the supplementary reflecting surface could be a coating on the bulb, or a fixture within the bulb, without departing from my invention. Moreover, the supplementary reflecting surface may be of other than spherical contour if greater diffusion be desired for the rays striking it.

It may be desirable to invert the headlights shown herein or to tilt or otherwise displace them for various purposes, in which case, however, the light distribution would have the same relation to the axis of the main reflector, but would be directed upwardly or sidewise instead of downwardly. Furthermore the position of the source 6 relatively to the focus of the main reflector may be altered to vary the character or the direction of the projection with respect to the axis of the main reflector.

Having thus described my invention, what I claim is:

1. In a headlight, a reflecting system comprising main and supplementary reflecting surfaces, a source of light positioned substantially at the focus of the main reflector and providing rays substantially all of which are projected by the reflecting system in a concentrated beam substantially parallel to the axis of the main reflector, and a second source of light slightly removed from said focus and providing rays substantially all of which are projected by the reflecting system in a concentrated beam to one side of said axis.

2. In a headlight, a main reflecting surface, two sources of light, and a supplementary reflecting surface opposed to the main reflecting surface and partly encompassing both sources of light, both of said reflecting surfaces terminating substantially in a plane through the focus of the main reflecting surface.

3. In a headlight, a main reflector, a primary source of light positioned substantially at the focus of said reflector, a second source of light slightly removed from said focus, and a supplementary reflecting surface partly encompassing both sources of light and being opposed to the main reflector, said supplementary reflecting surface being positioned to reflect to the main reflector substantially all the upwardly and forwardly directed unreflected rays from the second source.

4. In a headlight, a main reflector, a primary source of light positioned substantially at the focus of said reflector, a second source of light slightly removed from said focus, and a supplementary reflecting surface opposed to the main reflector and positioned to reflect to the main reflector substantially all the upwardly and forwardly directed unreflected rays from either source of light.

5. In a headlight, a main reflector, a source of light, and a supplementary reflecting surface opposed to the main reflector and centered on a point slightly removed from the focus of the main reflector, said supplementary reflecting surface reflecting to the main reflector substantially all the upwardly and forwardly directed rays from the source of light in such manner that the projection of those rays from the main reflector is confined below the horizontal.

6. In a headlight, a main reflector, a primary source of light positioned substantially at the focus of said reflector, a second source of light slightly removed from said focus, and a supplementary reflecting surface opposed to the main reflector and centered on a point removed from said focus, said supplementary reflecting surface reflecting to the main reflector substantially all the upwardly and forwardly directed rays from either source of light.

7. In a headlight, a main reflector, a primary source of light positioned substantially at the focus of said reflector, a second source of light slightly removed from said focus, and a supplementary reflecting surface partly encompassing both sources of light and being opposed to the main reflector, said supplementary reflecting surface being centered on the same side of the middle point of the primary source as is the middle point of the second source.

8. In a headlight, a main reflector, a primary source of light positioned substantially at the focus of said reflector, a second source of light slightly removed from said focus, and a supplementary reflecting surface partly encompassing both sources of light and being opposed to the main reflector, said supplementary reflecting surface being centered on substantially the middle point of the second source.

9. In a headlight, a main reflector, a source of light having its middle point to one side of the axis of the reflector, and a supplementary reflecting surface opposed to the main reflector and centered on a point lying on the same side of said axis, said supplementary reflecting surface partly encompassing said source and extending at least to said axis.

10. In a headlight, a main reflector of paraboloidal form, a source of light, and a supplementary reflecting surface opposed to the main reflector and partly encompassing the source in coöperation therewith, the axis of the supplementary reflecting surface being slightly removed from the focus of the main reflector, whereby the rays reflected from the supplementary reflecting surface to the main reflector are projected from the main reflector to one side of the axis thereof.

11. In a headlight, a main reflector, a source of light slightly removed from the focus, and a supplementary reflecting surface centered on a point slightly removed from the focus of the main reflector and partly encompassing the source, said supplementary reflecting surface being opposed to the main reflector.

12. In a headlight, a main reflector extending substantially on one side of a plane through its focus, a primary source of light positioned substantially at said focus, and a second source of light located substantially in said plane and slightly removed from said focus.

13. In a headlight, a main reflector extending substantially on one side of a plane through its focus, a primary source of light positioned substantially at said focus, a second source of light slightly removed from said focus, and a supplementary reflecting surface centered on a point slightly removed from said focus.

14. In a headlight, a main reflecting surface, a source of light slightly removed from the focus thereof, and a supplementary reflecting surface centered on a point slightly removed from said focus and partly encompassing said source in opposition to the main reflecting surface, one of said reflecting surfaces extending entirely on one side of a plane substantially through said focus.

15. In a headlight, a main reflecting surface, a source of light slightly removed from the focus thereof, and a supplementary reflecting surface centered on a point slightly removed from said focus and partly encompassing said source in opposition to the main reflecting surface, one of said reflecting surfaces terminating in a plane substantially through said focus.

16. In a headlight, a main reflecting surface, a source of light removed from the focus thereof, and a supplementary reflecting surface centered on a point slightly removed from the focus and partly encompassing said source in opposition to the main reflecting surface, both of said reflecting surfaces terminating substantially in the same plane.

17. In a headlight, a main reflector lying principally on one side of a plane in which lies the axis of said reflector, a primary source of light positioned substantially at the focus of said reflector, a second source of light slightly removed from said focus, and a supplementary reflecting surface coöperative with the second source.

18. In a headlight, a reflector, and an incandescent bulb containing two sources of light one located substantially at the focus of the reflector and the other slightly removed therefrom, the spherical surface of the bulb being centered substantially at the middle point of the second source.

19. In a headlight, a main reflector, and an incandescent lamp bulb containing two sources of light, one located substantially at the focus of the main reflector, and the other slightly removed therefrom, the axis of the bulb being offset from the axis of the main reflector, and the spherical surface of the bulb being centered substantially at the middle point of the second source.

20. Projection apparatus comprising a light source, a concave reflecting surface positioned on one side of a horizontal plane through the focus thereof so as horizontally to reflect a beam of light a considerable distance along a roadway, and a second source of light in the region of the focus but displaced from the focus in such manner that light therefrom is reflected to near and intermediate portions of the roadway but is not reflected upwardly.

21. Projection apparatus comprising a light source, a concave reflector positioned with its focus in the light source and adapted horizontally to reflect a beam of light a considerable distance along a roadway, a second source of light in the region of the focus but displaced from the focus in such manner that light therefrom is reflected to near and intermediate portions of the roadway, and means for preventing light from the second source from being reflected upwardly.

22. Projection apparatus comprising a light source, a substantially paraboloidal reflector positioned with its focus substantially in the light source for reflecting a concentrated beam of light horizontally, a second light source displaced from the focus, and a deflector for deflecting light from the second source to the paraboloidal reflector, the second source and the deflector being positioned with relation to each other and with relation to the reflector in such manner that the deflected light is substantially wholly reflected downwardly as a divergent beam.

23. Projection apparatus comprising a light source, a substantially paraboloidal reflector positioned with its focus substantially in the light source for reflecting a concentrated beam of light horizontally, a second light source displaced from the focus, and a deflector for deflecting light from the second source to the paraboloidal reflector, the second source and the deflector being positioned with relation to each other and with relation to the reflector in such manner that the deflected light is reflected downwardly as a divergent beam, and the second source being positioned with relation to the reflector in such manner that substantially no light is directly reflected upwardly, whereby the roadway in front of a vehicle may be illuminated throughout near, distant and intermediate portions without projecting substantially any light upwardly.

24. Projection apparatus comprisng a light source, a substantially paraboloidal reflector positioned at least in part below a horizontal plane containing its axis and positioned with its focus substantially in the light source for reflecting a concentrated beam of light horizontally, a second light source displaced from the focus, and a deflector for reflecting light from both sources to the paraboloidal reflector, the second source and the deflector positioned with relation to each other and with relation to the reflector in such manner that the deflected light is substantially wholly reflected in and below a horizontal direction.

25. Projection apparatus comprising a concave reflector, a light source at the focus of the reflector for projecting a beam of light horizontally, and a second light source axially displaced from the focus for projecting a divergent beam of light downwardly, the reflector being so constructed and the second light source being so disposed with relation to the reflector that substantially no light from the second light source is projected upwardly.

26. Projection apparatus comprising a light source, a concave reflector positioned with its focus in the light source and adapted horizontally to reflect a beam of light a considerable distance along a roadway, a second source of light in the region of the focus but displaced from the focus in such manner that light therefrom is reflected to near and intermediate portions of the roadway, and a supplementary reflecting surface for preventing substantially any light from the second source from striking the reflector in such manner as to be reflected upwardly.

27. Projection apparatus comprising a light source, a substantially paraboloidal reflector having its focus substantially in the light source for horizontally projecting a concentrated beam of light a considerable distance along a roadway, a second light source rearwardly displaced from the focus for projecting a divergent beam of light downwardly, and means to prevent substantially any light from the second source from striking the reflector in such manner as to be reflected upwardly, whereby near, distant and intermediate portions of the roadway are illuminated without producing upward glare.

28. Projection apparatus comprising a light source, a concave reflector positioned with its focus in the light source and adapted horizontally to reflect a beam of light a considerable distance along a roadway, a second source of light in the region of the focus but displaced from the focus in such manner that light therefrom is reflected to near and intermediate portions of the roadway, and means for reflecting light from the first source of the reflector in such manner as to be reflected in and below a horizontal direction and for deflecting light from the second source to the reflector in such manner as to be reflected downwardly as a divergent beam.

In testimony whereof I affix my signature.

STANLEY BROWN.